United States Patent
Wang et al.

(10) Patent No.: US 9,126,358 B2
(45) Date of Patent: Sep. 8, 2015

(54) METHOD OF IMPROVING THE APPEARANCE OF INJECTION MOLDING AND FOAMING PRODUCT

(71) Applicant: Yanfeng Automotive Trim Systems Co., Ltd., Shanghai (CN)

(72) Inventors: Weiyi Wang, Shanghai (CN); Yiping Ma, Shanghai (CN); Zifeng Chen, Shanghai (CN)

(73) Assignee: Yanfeng Automotive Trim Systems Co., Ltd., Shanghai (CN)

( * ) Notice: Subject to any disclaimer, the term of this patent is extended or adjusted under 35 U.S.C. 154(b) by 0 days.

(21) Appl. No.: 14/515,568

(22) Filed: Oct. 16, 2014

(65) Prior Publication Data

US 2015/0035193 A1    Feb. 5, 2015

Related U.S. Application Data

(63) Continuation of application No. 14/339,985, filed on Jul. 24, 2014, now abandoned.

(30) Foreign Application Priority Data

Jul. 25, 2013   (CN) .......................... 2013 1 0317641

(51) Int. Cl.
*B29C 33/48*   (2006.01)
*B29C 44/10*   (2006.01)
*B29C 44/02*   (2006.01)
*B29C 44/34*   (2006.01)
B29K 23/00   (2006.01)
B29K 105/00   (2006.01)
B29K 105/04   (2006.01)
B29K 105/16   (2006.01)

(52) U.S. Cl.
CPC ............. *B29C 44/105* (2013.01); *B29C 44/027* (2013.01); *B29C 44/3403* (2013.01); *B29K 2023/00* (2013.01); *B29K 2105/0088* (2013.01); *B29K 2105/04* (2013.01); *B29K 2105/043* (2013.01); *B29K 2105/16* (2013.01)

(58) Field of Classification Search
USPC ..................................... 264/45.1, 45.2, 50, 51
See application file for complete search history.

(56) References Cited

U.S. PATENT DOCUMENTS

2004/0108612 A1 *   6/2004   Yamaki et al. ............... 264/45.2

* cited by examiner

*Primary Examiner* — Stella Yi
(74) *Attorney, Agent, or Firm* — Dickinson Wright PLLC

(57) ABSTRACT

A method of improving the appearance of foaming injection molding product includes closing the moving mold and the fixed mold and setting a clamping force on the closed mold, wherein a mold cavity is formed between the moving mold and the fixed mold. The method proceeds by inflating the mold cavity with high pressure and high temperature gas until the air pressure in the mold cavity reaches 2-25 MPa and the temperature of the high pressure and high temperature gas is between 60-200° C., then injecting molten resin that contains foaming agent into the mold cavity while continuously inflating high pressure and high temperature gas. After injection completed, stopping inflating high pressure and high temperature gas and simultaneously releasing pressure, wherein the step of releasing pressure includes the step of opening the mold.

8 Claims, 2 Drawing Sheets

METHOD OF IMPROVING THE APPEARANCE OF INJECTION MOLDING AND FOAMING PRODUCT

CROSS-REFERENCE TO RELATED APPLICATIONS

This application is a continuation application and claims the benefit of application U.S. Ser. No. 14/339,985 filed Jul. 24, 2014 and CN201310317641.5 filed Jul. 25, 2013 which are hereby incorporated by reference as though set forth fully herein.

BACKGROUND OF THE INVENTION

1. Field of the Invention

The application relates to a method of foaming injection molding, and more particularly to a method of improving the appearance of foaming injection molding product.

2. Related Art

An increasing number of foaming injection molding product are applied to automotive interior product to achieve the light weight effect and meet the desired stiffness of product.

Chemical foaming refers to mixing a certain proportion of chemical foaming agent into resin, then injecting them into a mold cavity in closed state after melting and blending by screw of injection molding machine, the contacting surfaces of the molten resin and the mold are solidified to form a epidermal layer of product, but the central region of product remains stay at molten resin state. After mold filling of resin completed, opening the mold with a certain distance, such that the uncured molten resin in the central region along the wall thickness direction of product expands and foams to a desired thickness, then cooling and curing are carried on. In the process of chemical foaming injection molding, when the molten resin that contains foaming agent is injected between the core surface a and the cavity surface b of the mold, the bubbles produced by the foaming agent decomposition in the molten resin of the interior of the mold cavity begin to foam and grow rapidly due to the sharply decreasing gas pressure, especially serious at the end of the material flow and the surface of product. The bubbles will definitely break when they expand to a certain degree, thereby irregularity and air mark are formed on the surface of product which result in the decline of the appearance quality of product, as shown in FIG. 1, thus, it has to apply additional secondary processing to reprocess the appearance of product.

As mentioned above, it is easy to form irregularity and air marks due to the broken bubbles on the surface of product produced by the related process of chemical foaming injection molding technology, and finally result in the appearance defect.

In addition, because the air pressure inflated into the closed mold cavity is often below 2 MPa in prior art, specific leakproof structures and an air pressure detection and control system are essential for the mold. Meanwhile, the molds with the specific leakproof structures and the ordinary injection molds are used for their predetermined special applications and not in a common use, thus the cost for the molds is increased and the applications are limited.

Thus, a method to improve the appearance of foaming injection molding product is needed.

SUMMARY OF THE INVENTION

A method of improving the appearance of foaming injection molding product is provided to improve the appearance quality of the foaming injection molding product efficiently. It can obtain the appearance of the foaming injection molding product with high quality and save the step of secondary processing.

In order to achieve the above purpose, the invention provides the following technical solution:

a method of improving the appearance of foaming injection molding product, said method comprising the following steps of: closing the moving mold and the fixed mold, and setting a clamping force on the closed mold, wherein a mold cavity is formed between the moving mold and the fixed mold; inflating the mold cavity with high pressure and high temperature gas until the air pressure in the mold cavity reaches 2-25 MPa and the temperature of the high pressure and high temperature gas is between 60-200° C., then injecting molten resin that contains foaming agent into the mold cavity while continuously inflating high pressure and high temperature gas; and after injection completed, stopping inflating high pressure and high temperature gas and simultaneously releasing pressure, wherein the step of releasing pressure includes the step of opening the mold.

Preferably, inflating the mold cavity with high pressure and high temperature gas until the air pressure in the mold cavity reaches 4-7 Mpa.

Preferably, inflating the mold cavity with high pressure and high temperature gas until the air pressure in the mold cavity reaches 16-25 Mpa.

Preferably, the temperature of the high pressure and high temperature gas is between 80-120° C.

The total time of inflating the mold cavity with high pressure and high temperature gas is 3-15 s.

Preferably, the total time of inflating the mold cavity with high pressure and high temperature gas is 5-8 s.

Preferably, injecting the molten resin that contains foaming agent into the mold cavity occurs after inflating the mold cavity with high pressure and high temperature gas lasts 1-3 s.

Preferably, the step of opening the mold is processed with a delay of 0.2-2 s after the injection.

The step of releasing pressure includes the gas emission in the mold cavity through the gaps between the parting surfaces of the mold and between the inserts in the mold.

Only one slit is opened between the moving mold and the fixed mold at the beginning of opening the mold, while the central non-solidified molten resin along wall thickness in product expands and foams to a desired thickness, then the cooling and curing are carried on.

Preferably, the width of the slit is 0.5-3 mm.

Said molten resin is of the type of polyolefin, and said foaming agent is of the type of sodium bicarbonate or azo components, and the weight percentage of said foaming agent in the molten resin equals to 0.5-4%.

Said polyolefin resin contains rubber and elastomer with improved impact property; and 2-30% filler with improve rigid, such as talcum powder, calcium carbonate, mica, wollastonite and any materials which can be used to manufacture appearance parts; said polyolefin resin contains but not limits to the above fillers, any known additive filler be available for the appearance parts can be added into said polyolefin resin.

The method of this invention is especially suitable for the chemical foaming injection molding of thin-walled product, wherein the initial wall thickness before foaming is between 1-2 mm, and the foaming ratio of product is 0.5-1.5.

Compared to the prior art, the method of improving the appearance of foaming injection molding product of this invention has the following prominent benefits: 1) the high pressure and high temperature air inflated the mold cavity through air control equipment after mold closing establishes and maintains a certain gas pressure in the mold cavity, then the molten resin contained foaming agent is injected into the mold cavity, the pressure drop is as small as possible after the resin entered the mold cavity due to the original high gas pressure of high pressure and high temperature air exists in the mold cavity, thus, it substantially avoids the surface defect of product caused by the sharply nucleation, growth and rupture of the foaming agent; and due to the inflated high temperature gas, it will raise the temperature of the mold cavity and reduce the temperature difference between the melt and the mold cavity, thereby it further improves the ability to duplicate the detail texture structure on the surface of the mold of the product, and improves the defects such as the temperature difference lines on the product surface caused by the temperature difference. 2) when it reaches the predetermined inflating time, the air control equipment stops to inflate the mold cavity with air and begins to release pressure, the gas in the mold cavity escapes through the gaps between the parting surfaces of the mold and between the inserts in the mold at the same time, then open the mold, thus, the steps of inflating and releasing and the steps of the injection of the melt and opening the mold are carried on simultaneously without additional time; 3) This invention avoids the application of the sealing material and the sealing method with high precision and finally reduces mold cost through continuously inflating the mold cavity with high pressure and high temperature gas to maintain the higher level of gas pressure; 4) This invention includes following steps: inflating the mold cavity with high pressure gas until the air pressure reaches 2-25 MPa, then simultaneously injecting the molten resin with foaming agent into the mold cavity as inflating high pressure air; after injection completed, stopping inflating high pressure gas and simultaneously releasing pressure; wherein, the ordinary injection molds and the molds without specific leakproof structures/components and the air pressure detection and control system can be used due to the higher air pressure and the step of inflating high pressure gas during the injecting, thereby the manufacturing cost of the molds is reduced and the application ranges of this process is enlarged.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Combined with following embodiments, this invention will be more easily appreciated. It should be understood that the description is exemplary rather than limiting in nature.

Figure 1:
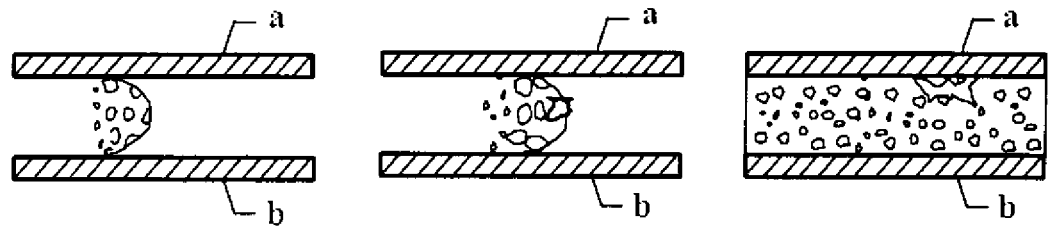
FIG. 1 shows the end of material flow and the surface of foaming product while foaming injection molding is carrying on according to the prior art.
Figure 2:
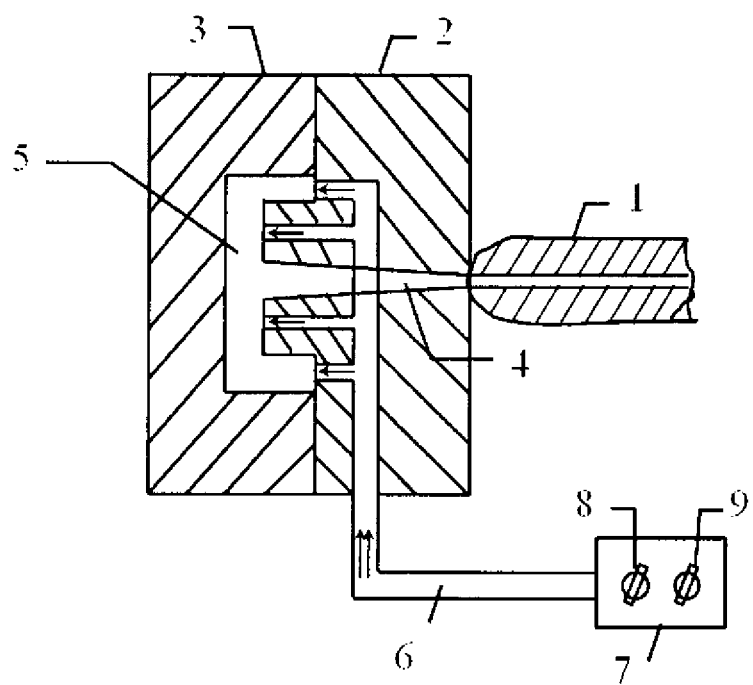
FIG. 2 is a schematic view of a foaming injection molding device according to the method of this invention.

FIG. 2 illustrates an foaming injection molding device according to the method of this invention, which includes a mold formed by the match of a fixed mold 2 and a moving mold 3, a screw 1 used to inject molten resin into said mold, and an air control equipment 7 for inflating said mold with high pressure and high temperature gas, wherein a mold cavity 5 is formed between the fixed mold 2 and the moving mold 3. A sprue 4 and an air path 6 are respectively disposed in the fixed mold 2; the sprue 4 connects the screw 1 with the mold cavity 5, and the air path 6 connects the air control equipment 7 with the mold cavity 5. A pressurizing valve 8 and a decompression valve 9 are disposed on the air control equipment 7. Gaps exist between the parting surfaces of the mold and between the inserts in the mold.

According to a preferred embodiment of this invention, a method of improving the appearance of foaming injection molding product is provided, wherein:

1) Melting and mixing polyolefin resin that contains foaming agent uniformly through the screw 1 of injection molding machine, wherein the screw 1 has the function of active pressure, and the screw 1 generates a certain pressure to prevent the foaming of the foaming agent in the interior of the screw 1 in the plasticizing process of the screw 1;

2) Closing the fixed mold 2 and the moving mold 3, and setting a clamping force on the closed mold. As opening the pressurizing valve 8 on the air control equipment 7, the high pressure and high temperature gas immediately flows into the interior of the mold through the air path 6 until the gas pressure in the mold reaches 2-17 MPa and the temperature of the high pressure and high temperature gas is between 60-200° C. After a certain period of inflating, the screw 1 begins to inject the melt into the mold cavity 5. It establishes a certain gas pressure in the interior of the mold through the inlet of the high pressure and high temperature gas. The certain gas pressure is greater than or equal to the gas pressure in the melt and substantially keeps balance with the gas pressure in the molten resin to prevent the surface defect of product caused by the sharply nucleation, growth and rupture of the foaming agent;

3) Inflating the mold cavity 5 with high pressure and high temperature gas until the predetermined time which is generally 3-15 s, then stop to inflate the mold cavity and begin to release pressure through opening the decompression valve 9 on the air control equipment 7, such that the gas in the interior of mold escape through the gaps between the parting surfaces of the mold and between the inserts in the mold;

4) After the molten resin that contains foaming agent is filled in the mold, opening mold is delayed for a period of time. While opening the mold, firstly only one slit is opened between the moving mold and the fixed mold to make the central non-solidified molten resin along wall thickness in product expands and foams to a desired thickness;

5) Cooling and taking out the finished product.

Figure 3:
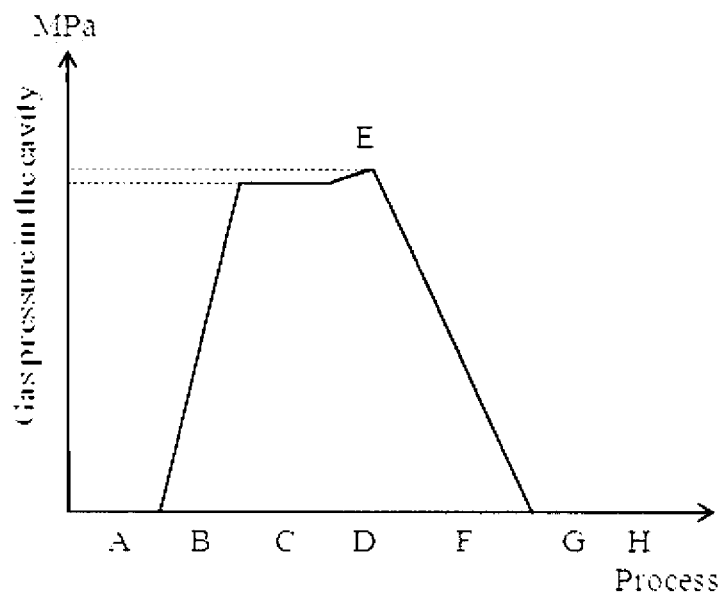
FIG. 3 is a schematic view of the interior gas pressure of the mold cavity changes over time according to the method of this invention.

In the aforementioned methods provided by the present invention, inflating and pressure relief, injecting and opening mold are processed in sequence respectively. However, inflating and pressure relief are processed accompany with injecting and opening mold. FIG. 3 shows the pressure change in the process of injection molding, wherein the letters represent respectively: A—closing mold; B—inflating high pressure and high temperature gas; C—establishing pressure in the mold cavity; D—injecting; E—pressure relief; F—opening mold and foaming; G—cooling product; H—taking out product. As shown in FIG. 3, the pressure in the mold cavity continuously increases as inflating high pressure and high temperature gas until step C and the pressure level-off. The pressure gradually rises up to the peak in the process of injecting the melt. After the injection completed, stop to inflate high pressure and high temperature gas and the gas in the mold cavity escapes through the gaps between the parting surfaces of the mold and between the inserts in the mold, such that the gas pressure continuously drops.

Figure 4:
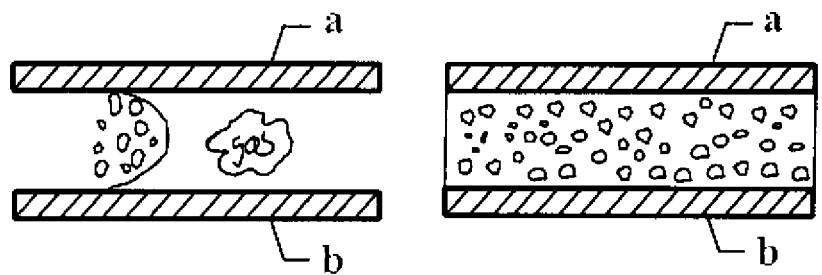
FIG. 4 is a schematic view of the end of material flow and the surface of foaming product while foaming injection molding is carrying on according to this invention.

FIG. 4 is a schematic view of the end of material flow and the surface of foaming product while foaming injection molding according to the method of present invention, wherein: because the interior of the mold is already inflated with high pressure and high temperature gas before injecting the melt, the pressure drop is not big after the resin being injected into the mold cavity, and there is no big void appeared but only the bubble with uniform size, thereby the appearance of obtained product is good.

According to one preferred embodiment of present invention, the high pressure and high temperature gas inflated said mold cavity is generally 2-17 MPa, preferably 4-7 MPa, the appearance of the obtained foaming injection molding product is best under the preferably pressure. The temperature of the high pressure and high temperature gas is between 60-200° C., and preferably between 80-120° C. When the gas pressure is below 2 MPa, the pressure in the mold is too low to restrain the expansion and growth of the foaming agent in the melt, such that the bubbles in the melt will break when they expand to a certain degree, thereby the concave-convex gas marks appear in the surface of product; on the other hand, when the gas pressure is over 17 MPa, the too high pressure in the mold will influence the foaming effect of the foaming injection molding product, thereby it will result in orange peel phenomenon on the surface caused by the undesirable foaming effect. It is appreciated that the above mentioned preferred air pressure 2-17 MPa is suitable for some products, such as a door panel, an insert trim and such products with similar size or of pony-size. It also shall be understood for the skilled person in the art that if the products are changed, the corresponding pressure may be adjusted according to the teaching of this invention, for example, for the products with larger size, such as a dash board, a defrosting grille and such products with similar size. In this case, if the air pressure is between 16-25 MPa, the products with larger size will represent good appearance quality.

According to another preferred embodiment of present invention, the predetermined time of inflating said mold cavity with high pressure and high temperature gas is generally 3-15 s, preferably 5-8 s. When the inflating time is shorter than 3 s, the interior of the mold can't establish enough gas pressure, such that the gas pressure in the mold is too low to restrain the expansion and growth of the foaming agent in the melt, thereby the bubbles in the melt will break when they expand to a certain degree, and further the concave-convex gas marks appear in the surface of product; on the other hand, when the inflating time is greater than 15 s, the too high pressure in the mold will influence the foaming effect of the foaming injection molding product, thereby it will result in orange peel phenomenon on the surface caused by the undesirable foaming effect.

According to another preferred embodiment of present invention, it is preferred to begin to inject after inflating said mold with high pressure and high temperature gas 1-3 s. Through inflating high pressure and high temperature gas in advance, it can establish a certain pressure in the interior of the mold before the injection of melt. If injection molding directly without delay, the foaming agent will begin to foam once it enters the mold. The bubbles in the melt will break when they expand to a certain degree, and further the concave-convex gas marks appear in the surface of product.

According to one preferred embodiment of present invention, it is preferred to open the mold with a 0.2-2 s delay after the injection completed. The delay makes the surface material of the melt solidified, thereby obtain a crust layer which benefits the appearance and performances of the product.

According to another preferred embodiment of present invention, the width of the slit is preferably 0.5-3 mm.

The method of this invention only applies to the chemical foaming injection molding of thin-walled product. The molten resin is of the type of polyolefin, and the foaming agent is of the type of sodium bicarbonate or azo components, and the weight percentage of the foaming agent in the molten resin equals to 0.5-4%.

The aforementioned preferable embodiments are exemplary rather than limiting in nature, and many variations of the present invention are possible in light of the above teachings. It is, therefore, to be understood that all easy, equivalent variations and modifications made according to the claims and description of present invention come within the scope of the invention as defined by the claims. The contents that have not been described in detail are the routine technical solutions.

What is claimed is:

1. A method of improving the appearance of a foaming injection molding product, comprising the following steps of:
   closing the moving mold and the fixed mold, and setting a clamping force on the closed mold, wherein a mold cavity is formed between the moving mold and the fixed mold and the closed mold does not need specific leak-proof structures;
   initially inflating the mold cavity with high pressure and high temperature gas prior to injecting molten resin and until an air pressure in the mold cavity reaches 16-25 MPa and a temperature of the high pressure and high temperature gas is between 60-200° C.;
   injecting molten resin that contains foaming agent into the mold cavity while continuously inflating high pressure and high temperature gas; and
   after injection is completed, stopping inflating high pressure and high temperature gas and simultaneously releasing pressure, wherein the step of releasing pressure includes the step of opening the mold, wherein only one slit is opened between the moving mold and the fixed mold at the beginning of opening the mold, while the central non-solidified molten resin along a wall thickness in the product expands and foams to a desired thickness, then, cooling and taking out the finished product;
   wherein a total time of inflating the mold cavity with high pressure and high temperature is 5-8 s.

2. The method according to claim 1, wherein the temperature of the high pressure and high temperature gas is between 80-120° C.

3. The method according to claim 1, wherein injecting the molten resin that contains foaming agent into the mold cavity occurs after initially inflating the mold cavity with high pressure and high temperature gas lasts 1-3 s.

4. The method according to claim 1, wherein the step of opening the mold is processed with a delay of 0.2-2 s after the injection.

5. The method according to claim 1, wherein the step of releasing pressure includes the gas emission in the mold cavity through the gaps between the parting surfaces of the mold and between inserts in the mold.

6. The method according to claim 1, wherein the width of the slit is 0.5-3 mm.

7. The method according to claim 1, wherein the molten resin is of the type of polyolefin, and the foaming agent is of the type of sodium bicarbonate or azo components, and the weight percentage of foaming agent in the molten resin equals to 0.5-4%.

8. The method according to claim 7, wherein said polyolefin resin contains rubber and elastomer with improved impact property; and 2-30% filler with improved rigid, such as talcum powder, calcium carbonate, mica, wollastonite and any materials which can be used to manufacture appearance parts.

* * * * *